US011403941B2

(12) United States Patent
Lange et al.

(10) Patent No.: US 11,403,941 B2
(45) Date of Patent: Aug. 2, 2022

(54) SYSTEM AND METHOD FOR CONTROLLING VEHICLES AND TRAFFIC LIGHTS USING BIG DATA

(71) Applicant: Toyota Motor North America, Inc., Plano, TX (US)

(72) Inventors: Armin Lange, Addison, TX (US); Michael B. Murray, Dallas, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 154 days.

(21) Appl. No.: 16/553,902

(22) Filed: Aug. 28, 2019

(65) Prior Publication Data

US 2021/0065545 A1 Mar. 4, 2021

(51) Int. Cl.

| | |
|---|---|
| ***G06G 7/70*** | (2006.01) |
| ***G06G 7/76*** | (2006.01) |
| ***G06G 1/00*** | (2006.01) |
| ***G06F 19/00*** | (2018.01) |
| ***G08G 1/095*** | (2006.01) |
| ***G08G 1/09*** | (2006.01) |
| ***G08G 1/01*** | (2006.01) |
| ***G08G 1/08*** | (2006.01) |
| ***G08G 1/082*** | (2006.01) |

(52) U.S. Cl.

CPC ........... *G08G 1/095* (2013.01); *G08G 1/0125* (2013.01); *G08G 1/08* (2013.01); *G08G 1/082* (2013.01); *G08G 1/091* (2013.01); *G08G 1/0112* (2013.01)

(58) Field of Classification Search

CPC ...... G08G 1/095; G08G 1/091; G08G 1/0125; G08G 1/082; G08G 1/083; G08G 1/22; G08G 1/20; G08G 1/08; G08G 1/0112

See application file for complete search history.

(56) References Cited

U.S. PATENT DOCUMENTS

| | | | |
|---|---|---|---|
| 7,092,815 | B2 | 8/2006 | Dort |
| 7,989,324 | B2 | 6/2011 | Chevion et al. |
| 9,076,332 | B2 | 7/2015 | Myr |
| 9,564,050 | B2 | 2/2017 | Krijger et al. |
| 9,947,145 | B2 | 4/2018 | Wang et al. |
| 9,963,145 | B2 | 5/2018 | Penilla et al. |
| 9,965,950 | B2 | 5/2018 | Xu et al. |
| 10,101,740 | B2 | 10/2018 | Tanaka et al. |
| 10,292,136 | B2 | 5/2019 | Rubin et al. |

(Continued)

*Primary Examiner* — Abby Y Lin
*Assistant Examiner* — Sohana Tanju Khayer
(74) *Attorney, Agent, or Firm* — Snell & Wilmer LLP

(57) ABSTRACT

Methods and systems for optimizing traffic flow. The system includes a plurality of vehicles each having a location sensor configured to detect location data and a transceiver configured to communicate the location data. The system also includes a remote data server. The remote data server is configured to receive the respective location data from the plurality of vehicles. The remote data server is also configured to determine swarm traffic flow data based on the respective location data from the plurality of vehicles. The remote data server is also configured to determine adjusted traffic light timing data to optimize traffic flow based on the swarm traffic flow data. The system also includes a plurality of traffic lights coupled to the remote data server and configured to receive the adjusted traffic light timing data and illuminate the plurality of traffic lights based on the adjusted traffic light timing data.

17 Claims, 5 Drawing Sheets

(56) References Cited

U.S. PATENT DOCUMENTS

| | | | | |
|---|---|---|---|---|
| 10,600,319 | B1 * | 3/2020 | Shuff | G08G 1/0116 |
| 2010/0171640 | A1 * | 7/2010 | Delia | G08G 1/07 340/907 |
| 2017/0069208 | A1 * | 3/2017 | Nair | G01C 21/3492 |
| 2017/0309092 | A1 | 10/2017 | Rosenbaum | |
| 2018/0203455 | A1 | 7/2018 | Cronin et al. | |
| 2019/0122548 | A1 * | 4/2019 | Sakuma | G08G 1/0145 |
| 2019/0236959 | A1 * | 8/2019 | Belapurkar | G08G 1/202 |
| 2020/0070834 | A1 * | 3/2020 | Mizoguchi | B60W 30/18163 |
| 2020/0242922 | A1 * | 7/2020 | Dulberg | G08G 1/042 |
| 2020/0284594 | A1 * | 9/2020 | Wang | G08G 1/096833 |
| 2020/0312155 | A1 * | 10/2020 | Kelkar | G08G 1/096758 |

* cited by examiner

SYSTEM AND METHOD FOR CONTROLLING VEHICLES AND TRAFFIC LIGHTS USING BIG DATA

BACKGROUND

1. Field

This specification relates to a system and a method for improving travel time of vehicles by using big data to control vehicles and traffic lights.

2. Description of the Related Art

Traffic congestion may occur on many roads when many drivers are on the same road heading in the same direction, and the road that the drivers are travelling on are unable to accommodate the number of vehicles being driven. This traffic congestion caused by groups of drivers travelling in large groups may occur on a regular basis, such as during weekday mornings or weekday evenings. Individual vehicles may take different routes to avoid the traffic. However, these alternate routes may include usage of smaller streets, which may slow down the drivers taking the alternate routes and may not ultimately save the drivers an appreciable amount of time. Traffic congestion is a nuisance to drivers and is highly undesirable. Thus, there is a need for systems to reduce traffic congestion.

SUMMARY

What is described is a system for optimizing traffic flow. The system includes a plurality of vehicles each having a location sensor configured to detect location data and a transceiver configured to communicate the location data. The system also includes a remote data server. The remote data server is configured to receive the respective location data from the plurality of vehicles. The remote data server is also configured to determine swarm traffic flow data based on the respective location data from the plurality of vehicles. The remote data server is also configured to determine adjusted traffic light timing data to optimize traffic flow based on the swarm traffic flow data. The system also includes a plurality of traffic lights coupled to the remote data server and configured to receive the adjusted traffic light timing data and illuminate the plurality of traffic lights based on the adjusted traffic light timing data.

Also described is a system for navigating a vehicle. The system includes an input/output device of the vehicle configured to receive a destination from a user of the vehicle. The system also includes a location sensor configured to detect a current location of the vehicle. The system also includes a transceiver of the vehicle configured to communicate the current location and the destination to a remote data server. The system also includes a memory of the remote data server configured to store swarm traffic flow data and traffic light timing data of traffic lights between the current location and the destination. The system also includes a processor of the remote data server configured to determine one or more routes from the current location to the destination based on the swarm traffic flow data and the traffic light timing data. The system also includes a transceiver of the remote data server configured to receive the current location and the destination from the transceiver of the vehicle and communicate the determined one or more routes from the current location to the destination to the transceiver of the vehicle for display by the input/output device of the vehicle.

Also described is a method for optimizing traffic flow. The method includes receiving, by a transceiver of a remote data server, from a plurality of vehicles, respective location data of the plurality of vehicles. The method also includes determining, by a processor of the remote data server, swarm traffic flow data based on the respective location data from the plurality of vehicles. The method also includes determining, by the processor of the remote data server, adjusted traffic light timing data to optimize traffic flow based on the swarm traffic flow data. The method also includes receiving, by a traffic light, the adjusted traffic light timing data. The method also includes illuminating, by the traffic light, one or more lights of the traffic light based on the adjusted traffic light timing data.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for controlling vehicles and traffic lights. The systems and methods described herein identify large groups of vehicles (vehicle swarms) using vehicle sensors. Once the vehicle swarms are identified, the traffic flow patterns of these swarms are identified. The systems and methods described herein use the traffic flow patterns of the vehicle swarms to adjust the traffic light timing of traffic lights in the streets where the vehicle swarms travel. The adjusted traffic light timing improves the throughput of the streets in which the traffic swarms travel, resulting in reduced traffic.

The systems and methods described herein may also take into account events that may slow down the traffic swarms, such as weather events, construction events, or concert events. In addition to adjusting the timing of the traffic lights, vehicles may be navigated using alternate routes based on the expected traffic swarm flow.

As used herein, "driver" may refer to a human being driving the vehicle when the vehicle is a non-autonomous vehicle, and/or "driver" may also refer to one or more computer processors used to autonomously or semi-autonomously drive the vehicle. "User" may be used to refer to the driver or occupant of the vehicle when the vehicle is a non-autonomous vehicle, and "user" may also be used to refer to an occupant of the vehicle when the vehicle is an autonomous or semi-autonomous vehicle.

Figure 1A:
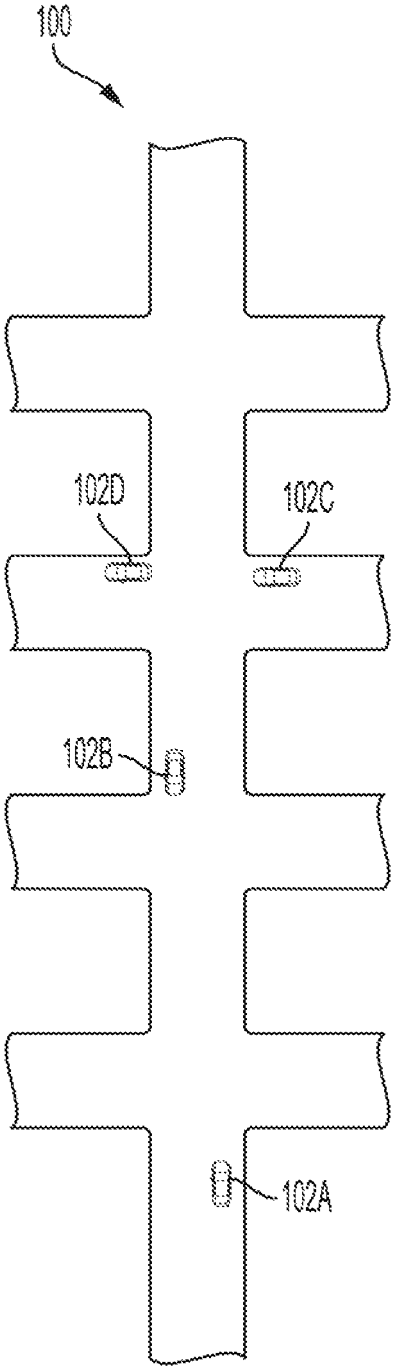
FIGS. 1A and 1B illustrate vehicle swarm movement, according to various embodiments of the invention.

FIG. 1A illustrates a map 100 of a plurality of vehicles 102 (e.g., 102A-102D). The vehicles 102 may be travelling along various roads on the map 100. The vehicles 102 may individually communicate vehicle telemetry data to a remote data server. The vehicle telemetry data may include location data, vehicle speed data, and vehicle orientation data. Based on the vehicle telemetry data from each of the vehicles 102, the remote data server may be able to make limited determinations about the driving environment. For example, if the first vehicle 102A is travelling at 0 mph and the location of the first vehicle 102A corresponds to an intersection, the remote data server may determine that the first vehicle 102A is stopped at a traffic light. However, if the second vehicle 102B is travelling at 0 mph and the location of the second vehicle 102B is in the middle of an intersection, the remote data server may not be able to determine why the second vehicle 102B is in the middle of the intersection and not moving. There may be traffic in the intersection, a closed lane, pedestrians, or any number of other reasons why the second vehicle 102B is in the middle of the intersection.

Figure 1B:
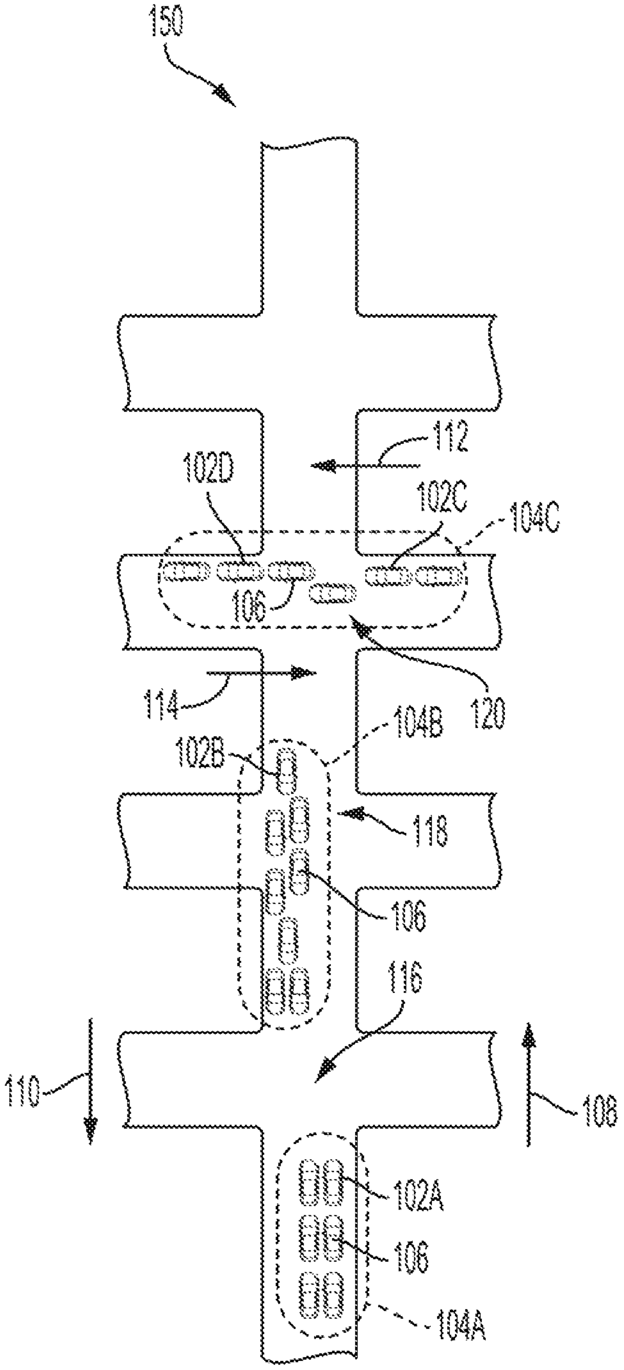

FIG. 1B illustrates a map 150 of the plurality of vehicles 102 along with other vehicles 106 that may not report their vehicle telemetry data to the remote data server. Thus, the remote data server may not be directly aware of the presence of the other vehicles 106.

A group of vehicles travelling together in close proximity may be referred to herein as a swarm. Map 150 illustrates multiple swarms 104. The first swarm 104A includes the first vehicle 102A, the second swarm 104B includes the second vehicle 102B, and the third swarm 104C includes the third vehicle 102C and the fourth vehicle 102D.

If the remote data server is aware of the presence of the second swarm 104B around the second vehicle 102B, the remote data server may be able to determine that the second swarm 104B travelling in the second direction 110 is being held up at the first intersection 116 due to a traffic light, similar to the first swarm 104A travelling in the first direction being held up at the first intersection 116 due to the traffic light.

In addition, if the remote data server is aware of the presence of the third swarm 104C around the third vehicle 102C and the fourth vehicle 104D travelling in the third direction 112, the remote data server may be better able to determine traffic flow trends. When the remote data server is only aware of discrete individual vehicles, the remote data server may not be able to determine larger trends in traffic flow. In addition, the travel patterns of swarms may be more reliable and predictable than the travel patterns of individual vehicles.

The remote data server may be capable of storing swarm traffic flow data determined based on historical location data and vehicle speed data of the swarms 104. The remote data server may then be able to determine optimal traffic light patterns based on the stored swarm traffic flow data.

Further still, when one or more of the vehicles 102, 106 are autonomously operated vehicles, the remote data server may be capable of coordinating the routes taken by the various vehicles to optimize traffic flow of the swarms. In some embodiments, vehicles may leave one swarm and join another swarm. For example, the third vehicle 102C may leave the third swarm 104C and join the second swarm 104B. If traffic flow trends were determined based on individual vehicles, this movement by the third vehicle 102C may skew the trends of individual vehicles, but when the trends are determined based on the swarms, the movement by vehicles between swarms may impact the traffic trends, while maintaining the accurate determination of traffic flow.

Figure 2:
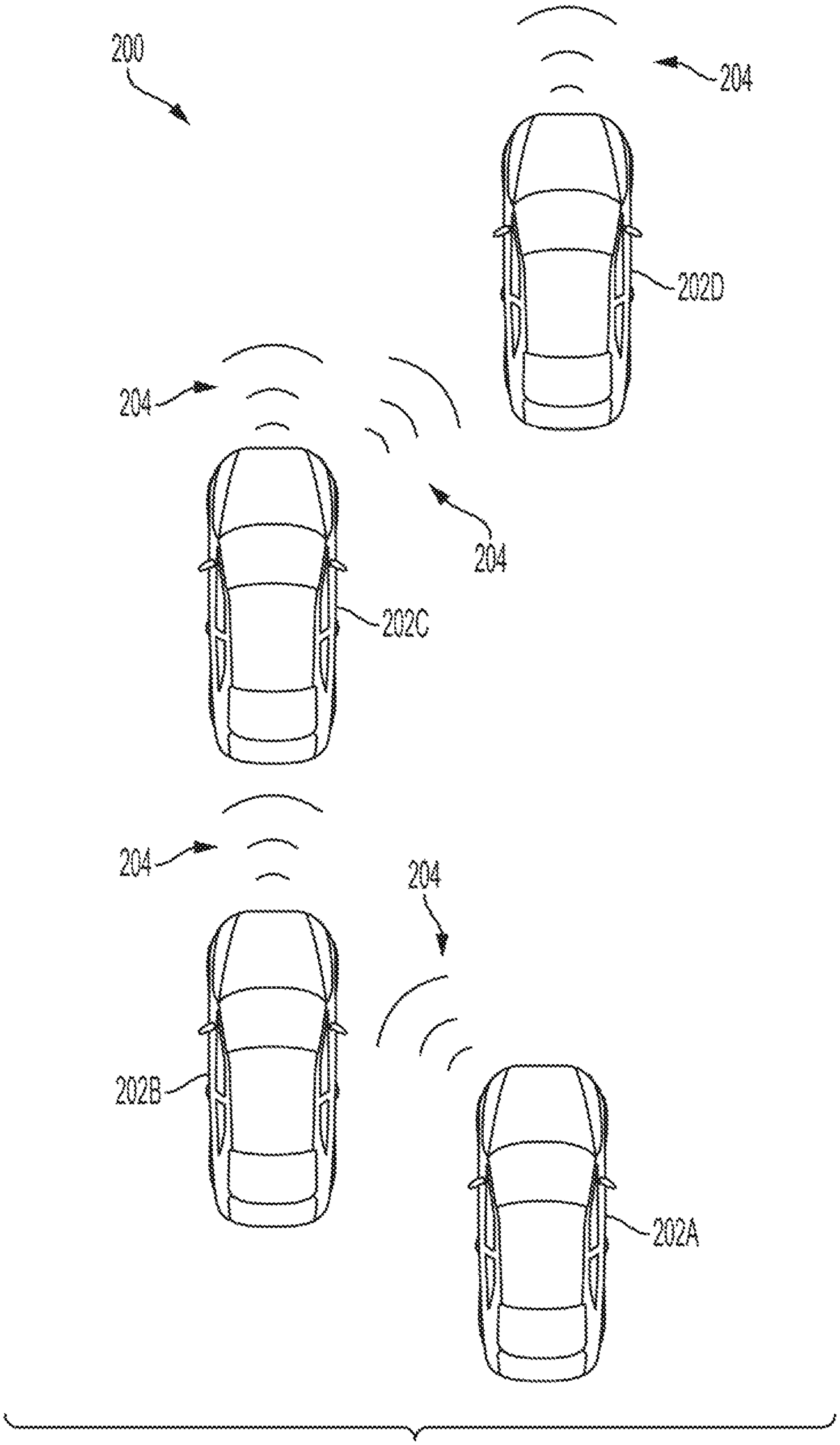
FIG. 2 illustrates identification of a swarm, according to various embodiments of the invention.

FIG. 2 illustrates a plurality of vehicles 202 that are a part of a swarm 200. The vehicles 202 may each have respective sensors configured to detect the presence of other vehicles in their vicinity. These sensors may be image sensors (e.g., cameras) or proximity sensors (e.g., LIDAR or RADAR), for example. The detection of the presence of other vehicles is illustrated as waves 204.

In some embodiments, the vehicles 202 communicate with each other to determine which vehicles are in the swarm 200. The first vehicle 202A detects that a second vehicle 202B is in front of the first vehicle 202A and to its left. The first vehicle 202A may communicate a request to the second vehicle 202B for an indication of whether a vehicle is in front of the second vehicle 202B. The second vehicle 202B may receive this communication and detect that a third vehicle 202C is in front of the second vehicle 202B. The second vehicle 202B may communicate a request to the third vehicle 202C for an indication of whether a vehicle is in front of the third vehicle 202C. The third vehicle 202C may receive this communication and detect that a fourth vehicle 202D is in front of the third vehicle 202C. The third vehicle 202C may communicate a request to the fourth vehicle 202D for an indication of whether a vehicle is in front of the fourth vehicle 202D.

The fourth vehicle 202D may provide an indication to the third vehicle 202C that no vehicle is in proximity to the fourth vehicle 202D in front. The third vehicle 202C may provide an indication to the second vehicle 202B that there is one vehicle in front of the third vehicle 202C. The second vehicle 202B may provide an indication to the first vehicle 202A that two vehicles are in front of the second vehicle 202B. In addition to the presence of a vehicle in proximity, a distance to the corresponding vehicle may also be provided. Thus, the first vehicle 202A may determine, based on the proximity data received from the second vehicle 202B, that there are three total vehicles in front of the first vehicle 202A in the swarm 200, and that the frontmost vehicle is 40 feet in front of the first vehicle 202.

As used herein, whether a vehicle is in proximity may be based on a distance threshold (e.g., 10 feet, 15 feet), and the distance threshold may vary based on the vehicle speed (e.g., 10 feet at 40 miles per hour, 15 feet at 60 miles per hour).

In some embodiments, the vehicles 202 each periodically communicate to a remote data server, and the remote data server determines which vehicles are in the swarm 200. For example, the first vehicle 202A, the second vehicle 202B, the third vehicle 202C, and the fourth vehicle 202D each communicate vehicle telemetry data to the remote data server, and the remote data server is able to identify the swarm based on location data and vehicle speed data.

In some embodiments, the vehicles 202 are prompted to provide vehicle telemetry data to the remote data server, and the remote data server determines which vehicles are in the swarm 200. For example, the first vehicle 202A detects that a second vehicle 202B is in front of the first vehicle 202A and to its left. The first vehicle 202A may communicate an instruction to the second vehicle 202B to communicate vehicle telemetry data to the remote data server. The second vehicle 202B may also detect that a third vehicle 202C is in front of the second vehicle 202B and communicate to the third vehicle 202C an instruction to communicate vehicle telemetry data to the remote data server. The third vehicle 202C may also detect that a fourth vehicle 202D is in front of the third vehicle 202C and communicate to the fourth vehicle 202D an instruction to communicate vehicle telemetry data to the remote data server.

In some embodiments, the frontmost vehicle and at least one other vehicle communicate (e.g., wirelessly transmit and receive) vehicle telemetry data to the remote data server. For example, the first vehicle 202A communicates vehicle telemetry data to the remote data server and detects that a second vehicle 202B is in front of the first vehicle 202A and to its left. The first vehicle 202A may communicate a request to the second vehicle 202B for an indication of whether a vehicle is in front of the second vehicle 202B, and if there is not, communicate vehicle telemetry data to the remote data server. The second vehicle 202B may receive this communication and detect that a third vehicle 202C is in front of the second vehicle 202B. The second vehicle 202B may communicate a request to the third vehicle 202C for an indication of whether a vehicle is in front of the third vehicle 202C, and if there is not, communicate vehicle telemetry data to the remote data server. The third vehicle 202C may receive this communication and detect that a fourth vehicle 202D is in front of the third vehicle 202C. The third vehicle 202C may communicate a request to the fourth vehicle 202D for an indication of whether a vehicle is in front of the fourth vehicle 202D, and if there is not, communicate vehicle telemetry data to the remote data server. The fourth vehicle 202D may accordingly communicate vehicle telemetry data to the remote data server. The remote data server may now have the vehicle telemetry data of the first vehicle 202A and the fourth vehicle 202D, and the remote data server may determine that the swarm is between these vehicles.

As described herein, once swarms of vehicles are identified, swarm traffic flow data may be determined, and the swarm traffic flow data may be used to adjust timing of lights to optimize traffic flow. In addition, the swarm traffic flow data may be used to optimize a route for individual vehicles.

Figure 3:
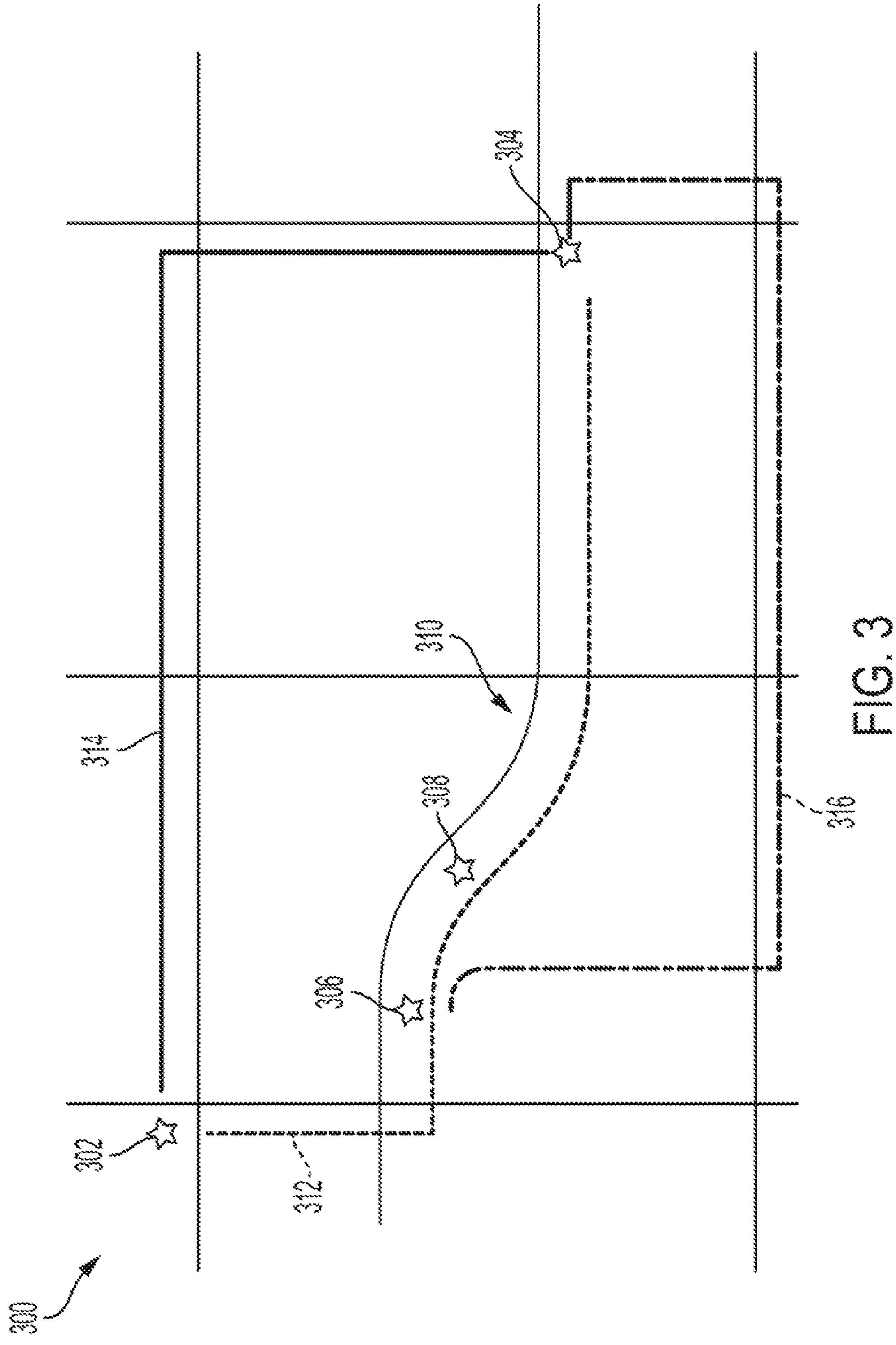
FIG. 3 illustrates vehicle routing based on swarm traffic flow data, according to various embodiments of the invention.

FIG. 3 illustrates a map 300 of roads, and a starting location 302 and a destination 304. A vehicle at the starting location 302 may travel to the destination 304 using a first route 312 or a second route 314. The first route 312 may be shorter in distance than the second route 314. However, there may be an incident at an incident location 310 along the first route 312, causing the second route 314 to be faster than the first route 312. The system may detect this incident based on the vehicle telemetry data of vehicles along the first route 312 and/or by another service or system that detects traffic incidents and the locations of those incidents.

If the vehicle is at the starting location 302, the system may determine that the second route 314 is faster, and the second route 314 is provided for the driver of the vehicle. If the vehicle is at a first intermediate location 306, the system may instruct the vehicle to change course to a third route 316 which is the fastest available route. If the vehicle is at a second intermediate location 308, the system may instruct the vehicle to remain on the first route 312 because turning around to take the third route 316 would take more time than staying on the first route 312.

In some embodiments, a first vehicle at the first intermediate location 306 and a second vehicle at the second intermediate location 308 may be part of a swarm. In these embodiments, the second vehicle may communicate to the first vehicle (via one or more intervening vehicles) that there is an incident at the incident location 310. The first vehicle may determine an alternate route, such as the third route 316 based on this information from the second vehicle in the swarm. The intervening vehicles that are unable to change to an alternate route may perform other actions based on the information from the second vehicle, such as changing lanes to be in an unobstructed lane, to improve traffic flow through the incident location 310.

As described herein, traffic lights between the starting location 302 and the destination 304 may be synchronized with the swarm traffic flow based on the swarm traffic flow data to optimize traffic flow.

Figure 4:
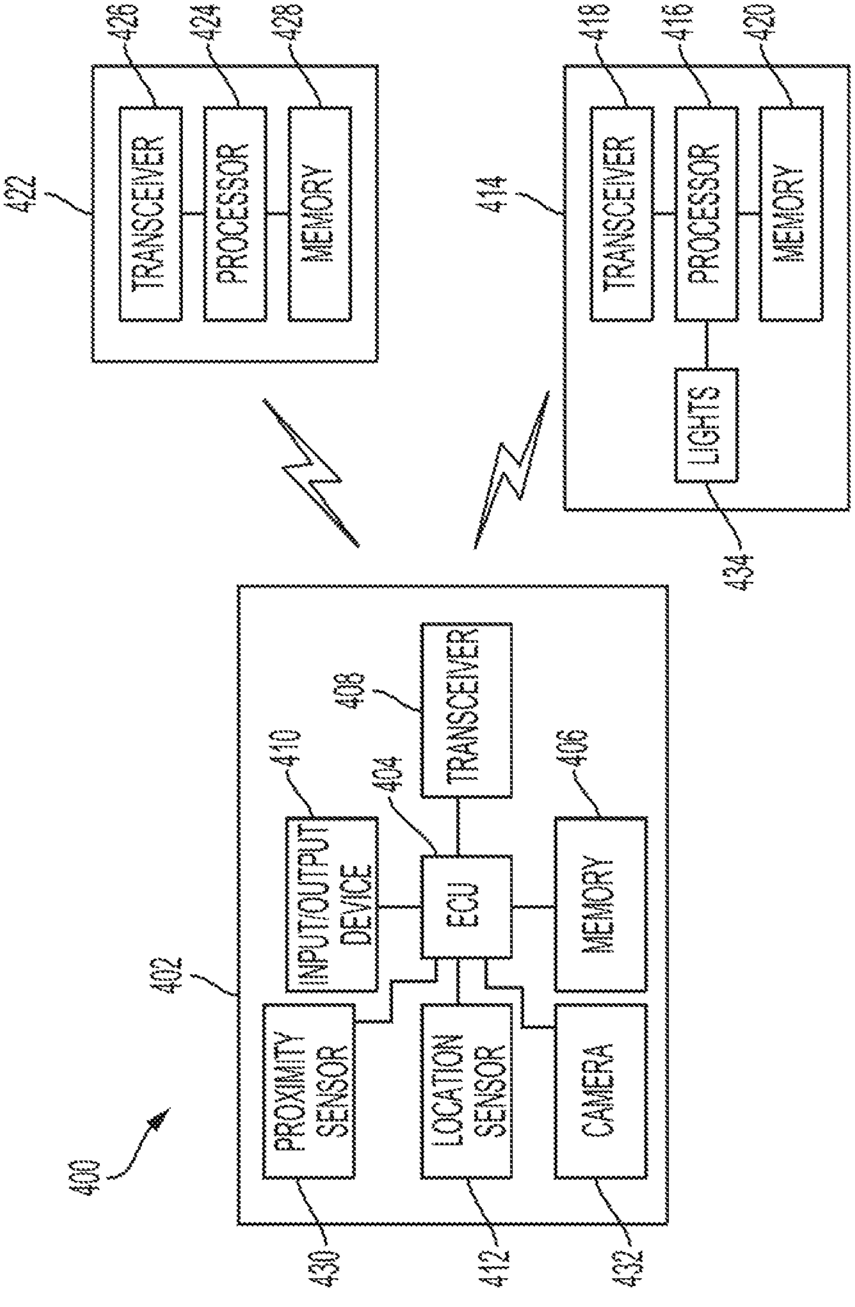
FIG. 4 illustrates a block diagram of the system, according to various embodiments of the invention.

FIG. 4 illustrates a block diagram of the system 400. The system 400 includes a vehicle 402, a traffic light 414, and a remote data server 422.

The vehicle 402 may have an automatic or manual transmission. The vehicle 402 is a conveyance capable of transporting a person, an object, or a permanently or temporarily affixed apparatus. The vehicle 402 may be a self-propelled wheeled conveyance, such as a car, a sports utility vehicle, a truck, a bus, a van or other motor or battery driven vehicle. For example, the vehicle 402 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 402 may be a semi-autonomous vehicle or an autonomous vehicle. That is, the vehicle 402 may be self-maneuvering and navigate without human input. An autonomous vehicle may use one or more sensors and/or a navigation unit to drive autonomously.

The vehicle 402 includes an electronic control unit (ECU) 404, an input/output device 410, a transceiver 408, a memory 406, a location sensor 412, a proximity sensor 430, and a camera 432.

Each ECU 404 may be one or more ECUs, appropriately programmed, to control one or more operations of the vehicle. The one or more ECUs 404 may be implemented as a single ECU or in multiple ECUs. The ECU 404 may be electrically coupled to some or all of the components of the vehicle. In some embodiments, the ECU 404 is a central ECU configured to control one or more operations of the entire vehicle. In some embodiments, the ECU 404 is multiple ECUs located within the vehicle and each configured to control one or more local operations of the vehicle. The ECU 404 may be one or more computer processors or controllers configured to execute instructions stored in a non-transitory memory 406.

The vehicle 402 and one or more other vehicles similar to vehicle 402 may be coupled to a network. The network, such as a local area network (LAN), a wide area network (WAN), a cellular network, a digital short-range communication (DSRC), the Internet, or a combination thereof, connects the vehicle 402 to a remote data server 422.

The transceiver 408 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G, 4G, or 5G). The transceiver 408 may transmit data to and receive data from devices and systems not directly connected to the vehicle. For example, the ECU 404 may communicate with the remote data server 422. Furthermore, the transceiver 408 may access the network, to which the remote data server 422 is also connected. The vehicle 402 may communicate with other vehicles directly or via a network.

The location sensor 412 is connected to the ECU 404 and configured to determine location data. The location sensor may be a GPS unit or any other global location detection device. The ECU 404 may use the location data along with the map data stored in the memory 406 to determine a location of the vehicle. In other embodiments, the location sensor 412 has access to the map data and may determine the location of the vehicle and provide the location of the vehicle to the ECU 404. In some embodiments, the location data of the vehicle 402 may be received from another device (e.g., mobile device, another vehicle) via the transceiver 408.

The memory 406 is connected to the ECU 404 and may be connected to any other component of the vehicle. The memory 406 is configured to store any data described herein, such as the map data, the location data, traffic light data, vehicle telemetry data, swarm traffic flow data, proximity data, and any data received from the remote data server 422 via the transceiver 408.

The input/output device 410 may be a touchscreen display or a display screen and an input device, such as a keyboard, a microphone, or buttons. The input/output device 410 may be a touchscreen of an infotainment unit of the vehicle 402, a heads-up display, or a combination of a display screen of the infotainment unit and one or more buttons or knobs used to interact with the infotainment unit.

The proximity sensor 430 is configured to detect proximity data between the vehicle 402 and other vehicles in the vicinity of the vehicle 402. The proximity sensor 430 is used to identify a swarm around the vehicle 402, as shown in FIG. 2. The proximity sensor 430 may be RADAR or LIDAR, for example.

The camera 432 is configured to detect image data between the vehicle 402 and other vehicles in the vicinity of the vehicle 402. The camera 432 is used to identify a swarm around the vehicle 402, as shown in FIG. 2.

The remote data server 422 includes a processor 424, a memory 428, and a transceiver 426. The processor 424 of the remote data server 422 may be one or more computer processors configured to execute instructions stored in non-transitory memory 428. The memory 428 may also store the traffic light data, including traffic light timing data and traffic light location data, of a plurality of traffic lights, such as traffic light 414. The processor 424 of the remote data server 422 may determine swarm traffic flow data based on the vehicle telemetry data received from the vehicle 402 and many other vehicles similar to vehicle 402. The processor 424 uses big data processing techniques to analyze the vehicle telemetry data and determine the swarm traffic flow data. For example, the processor 424 may organize the vehicle telemetry data by location at time intervals over the course of a day, and the processor 424 may identify swarms of vehicles based on the proximity of vehicles to each other. The threshold proximity between vehicles for grouping vehicles into a swarm may be predetermined and may be adjusted at any time. The processor 424 may track the movement of the identified swarms over the course of time to determine the swarm traffic flow data. The swarm traffic flow data includes identifications of each swarm, a size of each swarm, and location data of the swarm over time.

The remote data server 422 may receive traffic light timing data from the traffic light 414 or from another computing device via the transceiver 426. The processor 424 of the remote data server 422 may determine adjusted traffic light timing data to improve traffic flow based on the determined swarm traffic flow data. The processor 424 may use the transceiver 426 to communicate the adjusted traffic light timing data to the traffic light 414 and/or the other computing device, which communicates the adjusted traffic light timing data to a plurality of traffic lights. The processor 424 may also use the transceiver 426 to communicate the adjusted traffic light timing data to the vehicle 402.

The processor 416 of the traffic light 414 may instruct the lights 434 to illuminate in a particular order and for a particular duration based on the traffic light timing data or the adjusted traffic light timing data.

In some embodiments, the vehicle 402 receives the adjusted traffic light timing data from the traffic light 414 directly. The traffic light 414 includes a processor 416, a memory 420, and a transceiver 418. The processor 416 of the traffic light 414 may be one or more computer processors configured to execute instructions stored in non-transitory memory 420. The memory 420 may also store the traffic light data, including traffic light timing data and traffic light location data and the adjusted traffic light timing data. As described herein, the adjusted traffic light timing data may be received from the remote data server 422.

In some embodiments, the vehicle 402 communicates a current location and a destination to the remote data server 422, and the remote data server 422 may provide a plurality of routes and associated times based on the swarm traffic flow data and the adjusted traffic light timing data of traffic lights between the current location of the vehicle 402 and the destination. The remote data server 422 may have a plurality of processors specially configured for determining the plurality of routes and their associated times based on the swarm traffic flow data and the adjusted traffic light timing data, and the remote data server 422 may be better suited for this big data processing than the ECU of the vehicle.

In some embodiments, the vehicle 402 may receive the adjusted traffic light timing data and the swarm traffic flow data from the remote data server 422 and the vehicle determines the plurality of routes and associated times between the current location of the vehicle 402 and the destination.

In some embodiments, the swarm traffic flow data is communicated to a third party, such as a municipality, which may use the swarm traffic flow data to schedule events, such as construction in a manner that reduces impact on the traffic.

In some embodiments, the processor 424 of the remote data server 422 receives event data (e.g., from a vehicle or another computing device) and determines the adjusted traffic light timing data based on the event data. The event data may include a location and time duration of an event that may affect swarm traffic flow, such as a construction event, a sporting event, or a weather event. By adjusting the traffic light timing based on the event data, the impact of the event on traffic flow may be reduced.

While only one remote data server 422 is shown, any number of remote data servers in communication with each other may be used. For example, a first remote data server may be used to store and communicate traffic light data and a second remote data server may be used to store and communicate traffic data. Likewise, while only one traffic light 414 is shown, any number of traffic lights in communication with each other may be used.

Figure 5:
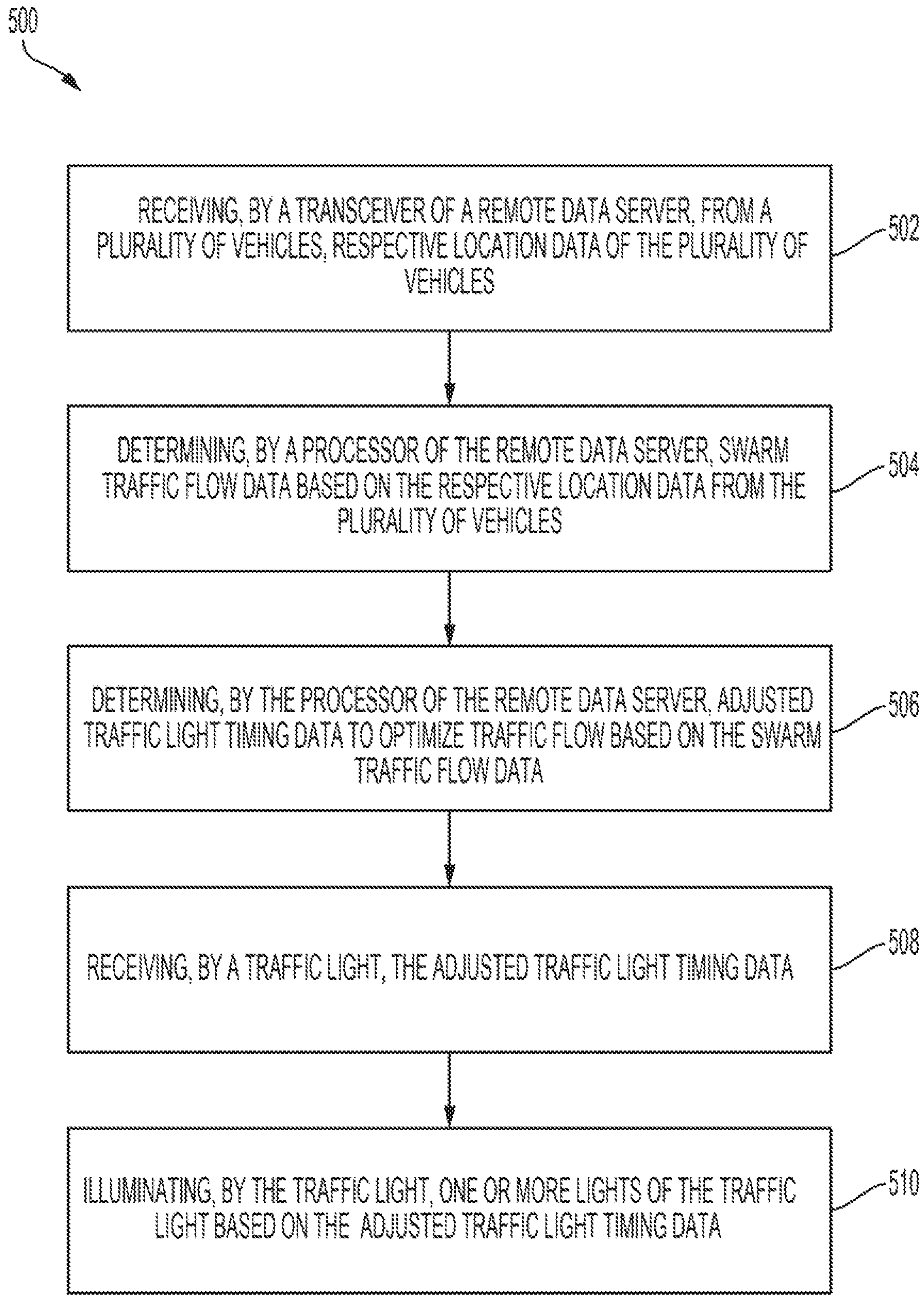
FIG. 5 illustrates a process of the system, according to various embodiments of the invention.

FIG. 5 illustrates a process 500 performed by the system described herein. A transceiver (e.g., transceiver 426) of a remote data server (e.g., remote data server 422) receives, from a plurality of vehicles (e.g., vehicle 402), respective location data of the plurality of vehicles (step 502). In particular, a transceiver (e.g., transceiver 408) of the vehicle may communicate the location data of the vehicle to the transceiver of the remote data server. The vehicles may communicate their location data on a periodic basis, or may be prompted to communicate their location data to the remote data server, as described herein. For example, a plurality of vehicles located in close proximity to each other may be prompted to communicate their location data to the remote data server. In some embodiments, all of the vehicles communicate their location data to the remote data server. In some embodiments, only the frontmost vehicle and the rearmost vehicles communicate their location data to the remote data server.

A processor (e.g., processor 424) of the remote data server determines swarm traffic flow data based on the respective location data from the plurality of vehicles (step 504). The swarm traffic flow data indicates the size and location of a swarm at any given time and location based on vehicle location data received by the remote data server. The processor may track the location of the swarm of vehicles over time to determine the swarm traffic flow data. In some embodiments, a threshold sample size of data must be exceeded before swarm traffic flow data may be determined.

The processor of the remote data server determines adjusted traffic light timing data based on the swarm traffic flow data (step 506). The adjusted traffic light timing data may adjust existing traffic light timing data of one or more traffic lights to optimize traffic flow. The existing traffic light timing data may be stored in a memory (e.g., memory 428) of the remote data server. The existing traffic light timing data may be received from a traffic light (e.g., traffic light 414) or from a vehicle, or from another remote data server (e.g., a remote data server associated with a municipality).

The processor may determine a duration of particular lights (e.g., red, green, red arrow, green arrow) at particular traffic light locations to optimize traffic flow. For example, when the swarm traffic flow data indicates that a swarm of vehicles travels southbound and very few vehicles travel eastbound at a given intersection at a given time, the processor may adjust the traffic light timing data to lengthen the green lights on the north and south sides of the intersection and may reduce the green lights on the east and west sides of the intersection.

The traffic light (e.g., traffic light 414) receives the adjusted traffic light timing data from the remote data server (step 508). In particular, a transceiver (e.g., transceiver 418) of the traffic light receives the adjusted traffic light timing data from the transceiver of the remote data server. The traffic light, the vehicles, and the remote data server may be connected via a network, such as the Internet.

The traffic light illuminates one or more lights (e.g., lights 434) of the traffic light based on the adjusted traffic light timing data (step 510).

The remote data server may communicate the adjusted traffic light timing data to one or more vehicles, and the vehicles may use the adjusted traffic light timing data to determine efficient routes from a current location to a destination.

The remote data server may also receive event data corresponding to an event (e.g., weather event, construction event, traffic event), and the processor of the remote data server may determine the adjusted traffic light timing data based on the event data in addition to the swarm traffic flow data and/or the existing traffic light timing data.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for optimizing traffic flow, the system comprising:

a plurality of vehicles each having a transceiver configured to communicate vehicle telemetry data including vehicle location data and vehicle speed data;

a remote data server configured to:

receive the respective vehicle telemetry data from the plurality of vehicles, receive event data including a location and a time duration of at least one event from at least one of the plurality of vehicles, determine swarm traffic flow data based on the respective vehicle telemetry data from the plurality of vehicles, transmit the swarm traffic flow data to a remote third-party server for the remote third-party server to schedule at least one future event based on the swarm traffic flow data to reduce traffic, and determine adjusted traffic light timing data to optimize traffic flow based on the event data and the swarm traffic flow data; and a plurality of traffic lights coupled to the remote data server and configured to receive the adjusted traffic light timing data and illuminate the plurality of traffic lights based on the adjusted traffic light timing data.

2. The system of claim 1, wherein the plurality of vehicles are each configured to detect the presence of one or more other vehicles to identify a swarm, and wherein the identified swarm and location data corresponding with the identified swarm is communicated to the remote data server.

3. The system of claim 2, wherein the plurality of vehicles are configured to identify the swarm by identifying a frontmost vehicle and a rearmost vehicle using at least one of a proximity sensor or a camera, and wherein the location data corresponding with the identified swarm includes location data of the frontmost vehicle and location data of the rearmost vehicle.

4. The system of claim 1, wherein at least one traffic light of the plurality of traffic lights is configured to store traffic light timing data and communicate the traffic light timing data to the remote data server, and wherein the remote data server is configured to determine the adjusted traffic light timing data based on the traffic light timing data and the swarm traffic flow data.

5. The system of claim 1, wherein the remote data server is further configured to communicate the adjusted traffic light timing data to one or more vehicles of the plurality of vehicles.

6. The system of claim 5, wherein the one or more vehicles of the plurality of vehicles are configured to determine an optimal route from a current location to a destination based on the adjusted traffic light timing data.

7. A system for navigating a vehicle, the system comprising:

an input/output device of the vehicle configured to receive a destination from a user of the vehicle;

a location sensor configured to detect a current location of the vehicle;

a transceiver of the vehicle configured to communicate the current location and the destination to a remote data server;

a memory of the remote data server configured to store event data, swarm traffic flow data and traffic light timing data of traffic lights between the current location and the destination, the event data including a location and a time duration of at least one event and being received from at least one of a plurality of vehicles including the vehicle, the swarm traffic flow data associated with one or more swarms of vehicles of the plurality of vehicles travelling together, each swarm of the one or more swarms identified by iteratively identifying vehicles behind a frontmost vehicle until a rearmost vehicle is identified, the traffic light timing data being adjustable based on the event data and the swarm traffic flow data;

a processor of the remote data server configured to determine one or more routes from the current location to the destination based on the event data, the swarm traffic flow data and the traffic light timing data; and a transceiver of the remote data server configured to receive the current location and the destination from the transceiver of the vehicle and communicate the determined one or more routes from the current location to the destination to the transceiver of the vehicle for display by the input/output device of the vehicle and transmit the swarm traffic flow data to a remote third-party server for the remote third-party server to schedule at least one future event based on the swarm traffic flow data to reduce traffic.

8. The system of claim 7, wherein the plurality of vehicles each have a location sensor configured to detect location data and a transceiver configured to communicate the location data to the remote data server, and wherein the remote data server is further configured to:

receive the respective location data from the plurality of vehicles, and determine the swarm traffic flow data based on the respective location data from the plurality of vehicles.

9. The system of claim 8, wherein the remote data server is further configured to determine adjusted traffic light timing data to optimize traffic flow based on the event data, swarm traffic flow data and the traffic light timing data, and communicate the adjusted traffic light timing data to the traffic lights between the current location and the destination.

10. The system of claim 8, wherein the plurality of vehicles are each configured to detect the presence of one or more other vehicles to identify a swarm of the one or more swarms, and wherein the identified swarm and location data corresponding with the identified swarm is communicated to the remote data server.

11. The system of claim 10, wherein the plurality of vehicles are configured to identify the swarm by identifying the frontmost vehicle and the rearmost vehicle using at least one of a proximity sensor or a camera, and wherein the location data corresponding with the identified swarm includes location data of the frontmost vehicle and location data of the rearmost vehicle.

12. The system of claim 8, wherein the remote data server is further configured to communicate the adjusted traffic light timing data to the transceiver of the vehicle.

13. A method for optimizing traffic flow, the method comprising:

receiving, by a transceiver of a remote data server, from a plurality of vehicles, respective location data and vehicle speed data of the plurality of vehicles;

receiving, by the transceiver of the remote data server, event data including a location and a time duration of at least one event from at least one of the plurality of vehicles;

identifying one or more swarms of vehicles travelling together;

determining, by a processor of the remote data server, swarm traffic flow data based on the respective location data from the plurality of vehicles;

transmitting, by the transceiver of the remote data server, the swarm traffic flow data to a remote third-party server for the remote third-party server to schedule at least one future event based on the swarm traffic flow data to reduce traffic;

determining, by the processor of the remote data server, adjusted traffic light timing data to optimize traffic flow based on the event data and the swarm traffic flow data;

receiving, by a traffic light, the adjusted traffic light timing data; and illuminating, by the traffic light, one or more lights of the traffic light based on the adjusted traffic light timing data.

14. The method of claim 13, wherein identifying the one or more swarms comprises:

detecting, by each vehicle of the plurality of vehicles, a presence of one or more other vehicles travelling with the vehicle, and wherein the method further comprises:

determining location data corresponding with the identified swarm; and communicating, by at least one vehicle of the plurality of vehicles, the location data corresponding to the identified swarm to the remote data server.

15. The method of claim 14, wherein identifying the one or more swarms further comprises identifying a frontmost vehicle and a rearmost vehicle using at least one of a proximity sensor or a camera of one or more vehicles in the plurality of vehicles, the location data corresponding with the identified swarm including location data of the frontmost vehicle and location data of the rearmost vehicle.

16. The method of claim 13, further comprising storing, by at least one traffic light of the plurality of traffic lights, traffic light timing data;

communicating, by the at least one traffic light of the plurality of traffic lights, the traffic light timing data to the remote data server; and determining, by the processor of the remote data server, the adjusted traffic light timing data based on the event data, traffic light timing data and the swarm traffic flow data.

17. The method of claim 13, further comprising communicating, by the transceiver of the remote data server, the adjusted traffic light timing data to one or more vehicles of the plurality of vehicles.

* * * * *